United States Patent
Niu et al.

(10) Patent No.: US 11,326,106 B2
(45) Date of Patent: May 10, 2022

(54) SOLID HAZARDOUS WASTE PYROLYSIS PROCESS AND FULL-SET EQUIPMENT

(71) Applicant: NIUTECH ENVIRONMENT TECHNOLOGY CORPORATION, Shandong (CN)

(72) Inventors: Xiaolu Niu, Jinan (CN); Haimin Zhang, Jinan (CN); Guoqian Han, Jinan (CN); Lanying Tong, Jinan (CN); Zhenkun Zhu, Jinan (CN); Shengyu Shi, Jinan (CN); Shuyin Tian, Jinan (CN); Zongcai Li, Jinan (CN); Bin Niu, Jinan (CN)

(73) Assignee: NIUTECH ENVIRONMENT TECHNOLOGY CORPORATION, Jinan (CN)

( * ) Notice: Subject to any disclaimer, the term of this patent is extended or adjusted under 35 U.S.C. 154(b) by 0 days.

(21) Appl. No.: 17/267,640

(22) PCT Filed: Feb. 18, 2019

(86) PCT No.: PCT/CN2019/075318
§ 371 (c)(1),
(2) Date: Feb. 10, 2021

(87) PCT Pub. No.: WO2020/062761
PCT Pub. Date: Apr. 2, 2020

(65) Prior Publication Data
US 2021/0269720 A1   Sep. 2, 2021

(30) Foreign Application Priority Data
Sep. 28, 2018  (CN) .......................... 201811137610.0

(51) Int. Cl.
*C10B 53/00*   (2006.01)
*C10B 5/00*   (2006.01)
(Continued)

(52) U.S. Cl.
CPC ................ *C10B 53/00* (2013.01); *B09B 3/40* (2022.01); *C10B 5/00* (2013.01); *C10B 7/00* (2013.01);
(Continued)

(58) Field of Classification Search
CPC . C10B 53/00; C10B 1/10; C10B 47/30; F27B 7/14; F27B 7/16; F27B 7/161; F27B 7/163; F27B 7/165; F27B 7/167
See application file for complete search history.

(56) References Cited

U.S. PATENT DOCUMENTS 1,712,083 A * 5/1929 Koppers ................... C10B 1/10
202/118
1,980,828 A * 11/1934 Lamie ...................... C10B 1/10
201/3
(Continued)

FOREIGN PATENT DOCUMENTS

CN     101469081 A    7/2009
CN     204939399 U    1/2016
(Continued)

OTHER PUBLICATIONS

Jun. 20, 2019 International Search Report issued in International Patent Application No. PCT/CN2019/075318.

*Primary Examiner* — Jonathan Luke Pilcher
(74) *Attorney, Agent, or Firm* — Oliff PLC

(57) ABSTRACT

A solid hazardous waste pyrolysis process and full-set equipment including a pyrolysis box for hazardous waste and intermittent pyrolysis equipment. The equipment includes an outer and rotatable inner barrel; at least one pyrolysis material placement area is formed in the inner barrel; the placement area formed by multiple groups of guide plates circumferentially arranged on the inner wall of the barrel and baffles arranged on the top of plates at the two ends; each group of plates include vertical and sieve plates
(Continued)

that are connected. Hazardous waste placed in the pyrolysis box; a box body is placed between the baffles of the pyrolysis material placement areas; after a pyrolysis device is sealed, heat is carried out to start pyrolysis; the box body rotates at the bottom of the inner barrel; and a material is heated, melts and falls onto the reaction medium below, completing pyrolysis of solid hazardous waste.

8 Claims, 7 Drawing Sheets

(51) Int. Cl.
    *C10B 7/00*     (2006.01)
    *C10B 33/00*     (2006.01)
    *C10B 49/04*     (2006.01)
    *C10G 1/04*     (2006.01)
    *B09B 3/40*     (2022.01)

(52) U.S. Cl.
    CPC .............. C10B 33/00 (2013.01); C10B 49/04 (2013.01); C10G 1/045 (2013.01); *C10G 2300/1003* (2013.01)

(56) References Cited

U.S. PATENT DOCUMENTS

| | | | | |
|---|---|---|---|---|
| 2,009,122 A * | 7/1935 | Reed | ......................... | C10B 1/10 |
| | | | | 202/218 |
| 2,287,437 A * | 6/1942 | Lesher | ...................... | C10L 5/06 |
| | | | | 201/5 |
| 4,285,773 A * | 8/1981 | Taciuk | ...................... | C10G 1/02 |
| | | | | 201/32 |
| 5,762,010 A * | 6/1998 | De Muynck | .......... | F23G 5/0276 |
| | | | | 110/346 |
| 8,168,839 B2 * | 5/2012 | Niu | ......................... | C10B 47/30 |
| | | | | 585/241 |
| 8,728,282 B2 * | 5/2014 | Niu | ......................... | C10B 49/16 |
| | | | | 202/100 |
| 8,764,945 B2 * | 7/2014 | Niu | ......................... | C10G 1/10 |
| | | | | 202/136 |
| 9,156,960 B2 * | 10/2015 | Niu | ......................... | C08J 11/10 |
| 2004/0024279 A1 * | 2/2004 | Mason | ...................... | G21F 9/32 |
| | | | | 588/317 |
| 2010/0121121 A1 * | 5/2010 | Niu | ......................... | B29B 17/04 |
| | | | | 585/241 |
| 2010/0282589 A1 | 11/2010 | Niu | | |
| 2010/0282590 A1 * | 11/2010 | Niu | ......................... | C10B 49/16 |
| | | | | 202/118 |
| 2014/0186233 A1 * | 7/2014 | Niu | ......................... | C10G 1/10 |
| | | | | 422/234 |

FOREIGN PATENT DOCUMENTS

| | | |
|---|---|---|
| CN | 206219507 U | 6/2017 |
| CN | 109158408 A | 1/2019 |
| KR | 1020170064797 A | 6/2017 |
| WO | 2015/198210 A1 | 12/2015 |

* cited by examiner

SOLID HAZARDOUS WASTE PYROLYSIS PROCESS AND FULL-SET EQUIPMENT

TECHNICAL FIELD

The invention belongs to the field of hazardous solid waste harmless treatment, and specifically relates to a solid hazardous waste pyrolysis process and full-set equipment.

BACKGROUND TECHNOLOGY

Hazardous solid waste is also known as hazardous waste, toxic waste residue, etc., which usually refers to solid waste with one or more hazardous characteristics such as toxicity, corrosiveness, flammability, reactivity and infectivity. Hazardous wastes come from a wide variety of sources, have many different kinds and are difficult to deal with. They not only pollute air, water and soil, but also harm human health and the environment through various channels. Hazardous solid waste affects the environment in many ways, each process ranging from its production, transportation, storage, treatment and disposal process may cause great harm to the environment. Hazardous solid waste is the final state of many pollutants, which will remain in the environment for a long time. In order to control its pollution to the environment, it is necessary to carry out ultimate disposal of it and find a reasonable way to maximize its isolation from the biosphere. Therefore, harmless treatment is not only the final solution, but also the last link of hazardous solid waste management.

Existing processing methods generally have landfill method, incineration method, solidification method, chemical method and biological method, these methods can only achieve good results in a short time, but long-term use will still cause irreversible damage to the environment, and at the same time, it is also a great waste of available resources in hazardous solid waste. Therefore, a safe and effective treatment method and process for hazardous solid waste is urgently needed to fill the gap in the prior art.

CONTENT OF INVENTION

In view of the above problem, the invention provides a solid hazardous waste pyrolysis process and full-set equipment, the equipment comprising a special pyrolysis box for solid hazardous waste and intermittent pyrolysis equipment. The intermittent pyrolysis equipment comprises an outer barrel and a rotatable inner barrel; at least one pyrolysis material placement area is formed in the inner barrel; the placement area is formed by multiple groups of guide plates circumferentially arranged on the inner wall of the inner barrel and baffles arranged on the top of guide plates at the two ends; each group of guide plates comprise vertical plates and sieve plates that are alternately connected, and the angle between the vertical plate and the sieve plate is greater than 90°, and a reaction medium is provided at the bottom of the inner barrel. By employing the solid hazardous waste pyrolysis full-set equipment having the described structure, solid hazardous waste may be placed in the special pyrolysis box for solid hazardous waste; a box body is placed between the baffles of the pyrolysis material placement areas; after a pyrolysis device is sealed, heating may be carried out to start pyrolysis, the inner barrel rotates to drive the box body to rotate at the bottom of the inner barrel; and a material in the box body is heated, melts and falls onto the reaction medium below, the reaction medium driven by the rotation of the inner barrel moves between the guide plates, the separation of solid products after pyrolysis is realized by constantly impacting with the vertical plates and sieve plates. The directional movement of solid products after pyrolysis is realized by adjusting the rotation direction of the inner barrel. Finally, the discharge of solid products after pyrolysis is realized by reversing the cracker, thus completing pyrolysis of solid hazardous waste. The invention realizes the pyrolysis treatment of solid hazardous waste for the first time. During the pyrolysis process, various harmful components are decomposed and the solid hazardous waste is pyrolysed into available oil and gas resources, which realizes considerable economic and social benefits, fills the gap in this field, and has high popularization and application value.

Part of the components of hazardous solid waste are polymer materials, which are difficult to degrade in nature, and will cause greater pollution through incineration and other means, the inventor of the invention takes this part of polymer materials as the starting point and selects the high temperature pyrolysis method to treat it. This part of the polymer component splits into low and medium molecular components at high temperatures, this part of the components can be condensed to form recyclable oil and gas resources, and as polymer materials generally play the role of skeleton in hazardous solid waste, the hazardous solid waste disintegrates naturally after pyrolysis of this part of polymer materials, wherein the gas part is discharged together with the oil and gas for harmless treatment, while the solid part becomes solid ash and is collected for harmless treatment, and dangerous part of the solid waste such as medical waste, which contains a lot of bacteria, under the action of high-temperature pyrolysis, the bacteria are completely killed to ensure the overall safety, and the whole pyrolysis process is completed in a sealed container, which will not cause secondary pollution to the environment, completely overcomes the disadvantages of the existing treatment methods, leading to the overall improvement of the harmless treatment of hazardous solid waste.

The specific technical scheme of the invention is as follows:

The invention relates to a solid hazardous waste pyrolysis process, which is a intermittent pyrolysis process. By collecting the solid hazardous waste into a special pyrolysis box for solid hazardous waste, the shell of the special pyrolysis box for solid hazardous waste is completely sealed and directly shipped transported to the intermittent pyrolysis equipment. Solid waste is pyrolysed through the way of intermittent heating pyrolysis, and the pyrolysis gas produced in the pyrolysis process is continuously discharged, and the solid products produced after pyrolysis are continuously discharged.

The above pyrolysis process fills the gap of the prior art for solid hazardous waste pyrolysis treatment in this field, by adopting intermittent pyrolysis to treat the solid hazardous waste, the separate pyrolysis process and temperature according to the characteristics of different sources of solid hazardous waste can be set. Thus, it improves the pyrolysis efficiency and overcomes the requirement of continuous pyrolysis process for the consistency of raw materials, and provides a new processing idea. In the above treatment process, the inventor chose that the pyrolysis gas generated in the pyrolysis process is continuously discharged, which can promote the improvement of pyrolysis efficiency, and avoid the safety risks caused by excessive gas accumulation. The obtained pyrolysis gas can be processed as soon as possible, which reduces the processing time. For the solid products produced after the pyrolysis process is completed, they are continuously discharged after pyrolysis is finished, which can ensure the sealing performance of the pyrolysis device and the stability of pyrolysis conditions in the whole pyrolysis process. In addition, this method can make the pyrolysis components in the solid hazardous waste stay in the pyrolysis device as much as possible, so that all of them can be pyrolysed into small molecular oil and gas resources and solid products, and improves the yield of oil and gas. At the same time, the harmless treatment of toxic and harmful substances in the hazardous solid waste can be realized in this process, which ensures the safety of the final solid product obtained.

Because some solid hazardous waste itself or in the pyrolysis process will produce a strongly irritating gas, which is different from available oil and gas resources, this part of gas needs separate harmless treatment, so it can be treated in the subsequent pyrolysis gas separation process. For the portion of gas remaining in the pyrolysis device, at the end of the intermittent pyrolysis, the gas in the pyrolysis device is completely replaced and treated harmlessly through steam or other inert gas replacement, to avoid the danger caused by the spillover of this part of gas when the pyrolysis device is opened.

Compared with the prior art, the pyrolysis process of solid hazardous waste provided by the present invention fills the gap in the prior art, which can carry out corresponding treatment of various solid hazardous waste in the prior art, and transform the pyrolysis part into reusable resources, which has higher popularization value and better social and environmental benefits.

The present invention also provides a full-set equipment for pyrolysis of solid hazardous waste, the equipment comprising a special pyrolysis box for solid hazardous waste and intermittent pyrolysis equipment. The intermittent pyrolysis equipment comprises an outer barrel and a rotatable inner barrel; at least one pyrolysis material placement area is formed in the inner barrel; the placement area is formed by multiple groups of guide plates circumferentially arranged on the inner wall of the inner barrel and baffles arranged on the top of guide plates at the two ends; each group of guide plates comprise vertical plates and sieve plates that are alternately connected; and a reaction medium is provided at the bottom of the inner barrel, and a reaction medium is also arranged between each group of guide plates, and the reaction medium is high temperature resistant spheres.

An openable cabin door is arranged on one side of the outer barrel, a hot air chamber is arranged between the outer barrel and the inner barrel, and a hot air outlet and a hot air inlet are arranged on the outer barrel; the end of the inner barrel far away from the cabin door is provided with a discharge head which is integrated with the inner barrel and can rotate with the inner barrel, the middle of the discharge head is provided with a discharge port, the discharge port is connected with the inner barrel, the center of the discharge port is provided with an oil and gas pipe, the air inlet end of the oil and gas pipe is arranged in the inner barrel, and the air outlet end passes through the discharge head; a discharge spiral is arranged on the inner wall of the discharging port, a lifting flight is arranged on the side of the inner wall of the inner barrel wall close to the discharging port, and a horn shaped solid material outlet is arranged at the end of the discharging spiral; the bottom of the discharging head is connected with a solid product discharging device, the device is a spiral discharging device, and the feed inlet of the spiral discharging device is arranged below the solid material outlet, an outlet of the spiral discharging device is arranged at the top of the discharging device far away from the feed inlet.

The outer side of the discharge head is connected with an outer sealing head, the outlet end of the oil and gas pipe goes through the outer sealing head and is fixed on the outer sealing head, the outer side of the oil and gas pipe near the outer sealing head is provided with a gas retaining annular plate, the outer side of the oil and gas pipe inside the gas retaining annular plate is provided with a heat preservation chamber I; and the outer side of the spiral discharging device near the discharge head is also provided with a heat preservation chamber II.

The structure of the special pyrolysis box for solid hazardous waste used in the invention is as follows:

Comprising a box body and a box lid, the box body and the box lid is flexibly connected by a rotating shaft or other ways, the bottom of the box body to at least ⅓-½ height of the box body is a non-porous box body, the rest of the box body and/or the box lid are provided with air vents, the outside of the box body and the box lid is coated with a pyrolyzable laminating film.

The box lid of the special pyrolysis box for solid hazardous waste with this structure is opened when it is used, and the solid hazardous waste is put into the box body. When the height of hazardous waste piled up in the box body is basically equal to the height of the box lid, the box lid can be directly closed. In order to avoid the random opening of the box body and the box lid, a locking mechanism can be set on the opposite side of the connection structure of the box body and the box lid, such as bayonet, fixed pin, etc., which can achieve locking, so as to avoid the separation of the box body and the box lid in the process of handling and transportation. The ⅓-½ height from the bottom of the box body to the lower part of the box body is a non-porous box, which avoids the leakage of a small amount of residual liquid in the solid hazardous waste; the rest of the box body and/or the box lid are provided with air vents, when there is no liquid in the solid hazardous waste to be treated, the design with all air vents on the box body can be adopted to increase the pyrolysis efficiency; when the pyrolysis box is sent to the pyrolysis device for pyrolysis, there are corresponding air vents to ensure that the gas generated by pyrolysis is discharged. The outermost layer of the box body and the box lid is coated with the pyrolyzable laminating film. The laminating film is directly coated with the prior art after the box body is filled with solid hazardous waste and the box body and the box lid are completely closed, which prevents the leakage of waste liquid, the diffusion of odor and the spread of germs in the process of collection, storage and transportation of solid hazardous waste. In order to achieve better effect, the laminating film needs to be set up in multiple layers. When the pyrolysis box is sent to the pyrolysis device, the laminating film is also pyrolysed, ensuring that the gas generated by pyrolysis can be smoothly discharged from the air vents into the pyrolysis device, it can also avoid the environmental pollution caused by the second unpacking in order to remove the solid waste before pyrolysis.

The guide plates are circumferentially arranged on the inner barrel, and each group of guide plates is provided with a uniform notch, and preferably, the angle between each vertical plate and the sieve plate which is comprised of the guide plate is greater than 90°; the spherical reaction medium is arranged between the guide plates of the pyrolysis material placement area with this structure. With the rotation of the inner barrel, these medium move back and forth between the vertical plate and the sieve plate, collide and extrude each other, so as to realize the self-cleaning of the surface of the medium.

The baffle plates arranged on the top of the guide plates at the two ends form a closed annular track, which is convenient for putting the special pyrolysis box containing solid hazardous wastes into it, so that the bottom of the box is supported by the guide plates and will not directly contact with the inner barrel, and with the rotation of the inner barrel, the box body rotates, so that the solid hazardous waste is uniformly heated and melted for pyrolysis, and the melted material drops to the guide plate below through the holes, and continues to pyrolyse after wrapping the spherical reaction medium; combined with the characteristics of the guide plates and the baffles, during the pyrolysis process, in addition to the pyrolysis, most of the materials after melting of solid hazardous waste drop onto the reaction medium spheres. With the reaction medium spheres moving back and forth between the vertical plates and the sieve plates, they collide and extrude with each other, which make the material to be pyrolysed more evenly and improve the pyrolysis efficiency. At the same time, ash and other products will adhere to the reaction medium spheres after pyrolysis is completed, and the reaction medium spheres move back and forth between the vertical plates and the sieve plates, when they strike the sieve plates, this part of ash will be knocked down and enters into the next group of guide plates from the plate holes of the sieve plates. After the rotation of the barrel body, this kind of impact occurs one by one, and this part of ash can be sent out from the plate holes and finally discharged from the pyrolysis material placement area; each group of guide plates is provided with a uniform notch, and the reaction medium spheres are arranged at the bottom of the inner barrel, in this way, when the notch is rotated to the bottom of the inner barrel, the reaction medium spheres between the guide plates can be replaced with the reaction medium spheres arranged at the bottom of the inner barrel, at the same time, the materials to be pyrolysed attached to the reaction medium spheres can be dispersed better, and the self-cleaning effect can also be achieved through the interaction between the reaction medium spheres.

In order to achieve better results, reaction medium spheres can also be set in the special pyrolysis box for solid hazardous waste. These high-temperature resistant spheres can play a better role in helping the pyrolysis of solid hazardous waste in the pyrolysis box. At the same time, it plays the role of secondary crushing and separation of solid hazardous waste in the rotation process. In order to avoid the falling of this part of the reaction medium, the diameter of the air vent on the box body and box lid is generally controlled to be less than the diameter of the sphere. The special pyrolysis box for solid hazardous waste can be a sphere or a cylinder, as long as its size can be matched with the annular track formed by the baffles. In addition, a lifting ring or a fixed hole can be set outside the special pyrolysis box for solid hazardous waste, which is convenient to be put into or taken out from the intermittent pyrolysis equipment by lifting or forklift transportation.

What the inventor needs to explain is that the device of the invention can realize intermittent pyrolysis equipment. When working, it needs to open the cabin door first, put the special pyrolysis box containing solid hazardous waste into the inner barrel, and directly place it between the baffles which is arranged on the top of the guide plates at the two ends. In this way, during the rotation of the inner barrel, the special pyrolysis box actually rotates by itself at the bottom of the inner barrel all the time, and the reaction medium spheres between the guide plates actually move within the range of the bottom of the inner barrel, and its vertical movement range is small, so the medium spheres will not rise with the rotation of the inner barrel, because the inner barrel is set horizontally, with the rotation of the inner barrel, the motion range of the reaction medium spheres in the horizontal direction is also very small, so the reaction medium spheres will not roll back and forth in the inner barrel. However, when the reaction medium spheres hit the sieve plates, the reaction medium spheres are rebounded, but the solid ash attached on them will obtain a horizontal momentum through the impact and will be sent out through the plate holes, this part of ash can be sent out by superposing each other, and the continuous movement of this part of ash in the same direction at the bottom of the inner barrel can be realized, and the direction of movement is determined by the rotation direction of the inner barrel. In the pyrolysis process, in order to ensure the complete pyrolysis of the solid hazardous waste, the rotation direction of the inner barrel can be changed several times, the residence time of the material in the inner barrel can be prolonged, the number of collisions between the medium spheres can be increased, and the pyrolysis efficiency can be improved. When the reaction is completed, it only needs to control the rotation of the inner barrel to make the pyrolysis ash continue to move towards the direction of the discharge port.

When discharging, ensure that the inner barrel continuously rotates in the discharging direction. At this time, under the dual action of the reaction medium spheres and the rotation of the barrel body, the solid ash continues to move toward the outlet end. When moving to the position of the lifting flight, the lifting flight will pick up the ash and send it to the top of the discharge port along with the rotation of the barrel body, the ash falls into the discharge spiral under the action of gravity, the discharge spiral rotates with the inner barrel, thus transporting this part of ash forward, then successively falls into the feed inlet of the spiral discharging device below through the horn shaped solid material outlet, under the function of the spiral discharging device, the sealing of material accumulation in the front section of the outlet of the spiral discharging device is realized, and is finally sent out through the outlet of the spiral discharging device.

In the pyrolysis process, the solid hazardous waste is pyrolysed into oil and gas, which is the main part that we can recycle. Because the oil and gas generated by pyrolysis is continuous, it is necessary to send this part of oil and gas out in time. The oil and gas are sent out of the pyrolysis device through the oil and gas pipe and into the oil and gas post-treating device; since this unit is an intermittent pyrolysis equipment, the temperature distribution in the unit is uneven at the beginning of pyrolysis. When the pyrolysed oil and gas move to the oil and gas pipe, if the temperature of the oil and gas pipe is lower than the pyrolysis temperature, the oil and gas will condense and adhere to the oil and gas pipe, which will affect the final oil and gas yield. In order to avoid this situation, the outer side of the oil and gas pipe near the outer sealing head is provided with a gas retaining annular plate, and the outer side of the oil and gas pipe inside the gas retaining annular plate is provided with a heat preservation chamber I, so that the oil and gas leakage can be prevented first, and at the same time, the heat preservation medium, such as continuous hot air, can be introduced into the heat preservation chamber I, so as to ensure that the temperature of the oil and gas pipe reaches the standard and avoid oil and gas condensation in the oil and gas pipe, further improve oil and gas yield; similarly, in order to prevent oil and gas from condensing and producing oil sludge and other substances after entering the spiral discharging device, the outer side of the spiral discharging device near the discharge head is provided with a heat preservation chamber II, in which the same heat preservation medium as that in the heat preservation chamber I can be introduced, so as to ensure the gas state of oil and gas and realize the gas seal of the spiral discharging device at the same time.

The inner barrel in the invention needs to be rotated, so the bottom of both sides of the inner barrel is provided with a rotational mechanism, and the rotational mechanism on either side can be connected with a rotating motor to provide energy for the rotation of the inner barrel.

Further, multiple groups of pyrolysis material placement areas can be set up inside the inner barrel of the invention, so that each group of pyrolysis materials placement areas can be placed with the special pyrolysis box for solid hazardous waste, so that the pyrolysis amount in a batch can be increased and the utilization rate of energy can be improved. And more reaction medium spheres should be put into the multiple groups of pyrolysis material placement areas to improve pyrolysis efficiency.

Preferably, the vertical plates and sieve plates of each group of guide plates can be arranged in the same way, or the interlaced arrangement of vertical plates and sieve plates between adjacent two groups of guide plates can be adopted, that is, one group of adjacent two groups of guide plates at the same horizontal position is vertical plates, and the corresponding group is guide plates, which can more conveniently discharge solid ash.

The above treatment device is a pyrolysis treatment device. The high temperature in the pyrolysis process can treat the harmful components in solid hazardous waste. Some solid hazardous waste itself or after pyrolysis may also produce odorous substances. Considering the actual situation of the invention, the inventor can reserve an inlet pipe in the inner barrel. After the intermittent pyrolysis is completed, the gas in the pyrolysis device can be replaced by injecting inert gas or water vapor, and the odorous gas can be discharged through the oil and gas pipe. The rapid cooling of the inner barrel can be realized at the same time. The specific structure will not be described here by the inventor. Please refer to the structure in other similar patents previously applied by the inventor.

In summary, compared with prior art, this invention provides a completely new concept of treatment technology and full-set equipment, which realizes the pyrolysis treatment of solid hazardous waste in the field for the first time. All kinds of pyrolysed components and harmful components are decomposed in the pyrolysis process, and the solid hazardous waste is pyrolysed into available oil and gas resources, which realizes considerable economic and social benefits, fills the gap in this field, and has high popularization and application value.

Figure 1:
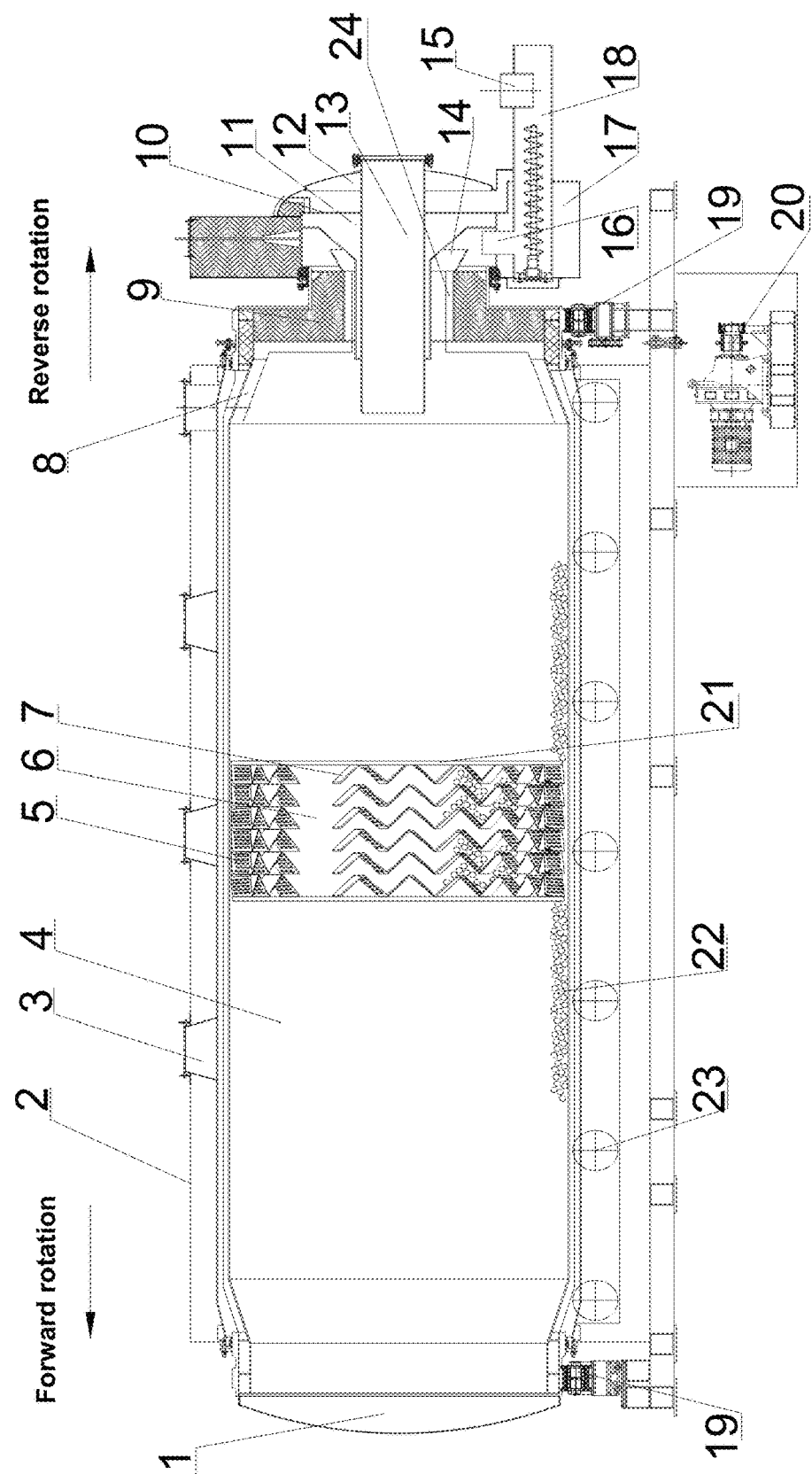
FIG. 1 is a structural diagram of the solid hazardous waste pyrolysis device of the present invention.
Figure 2:
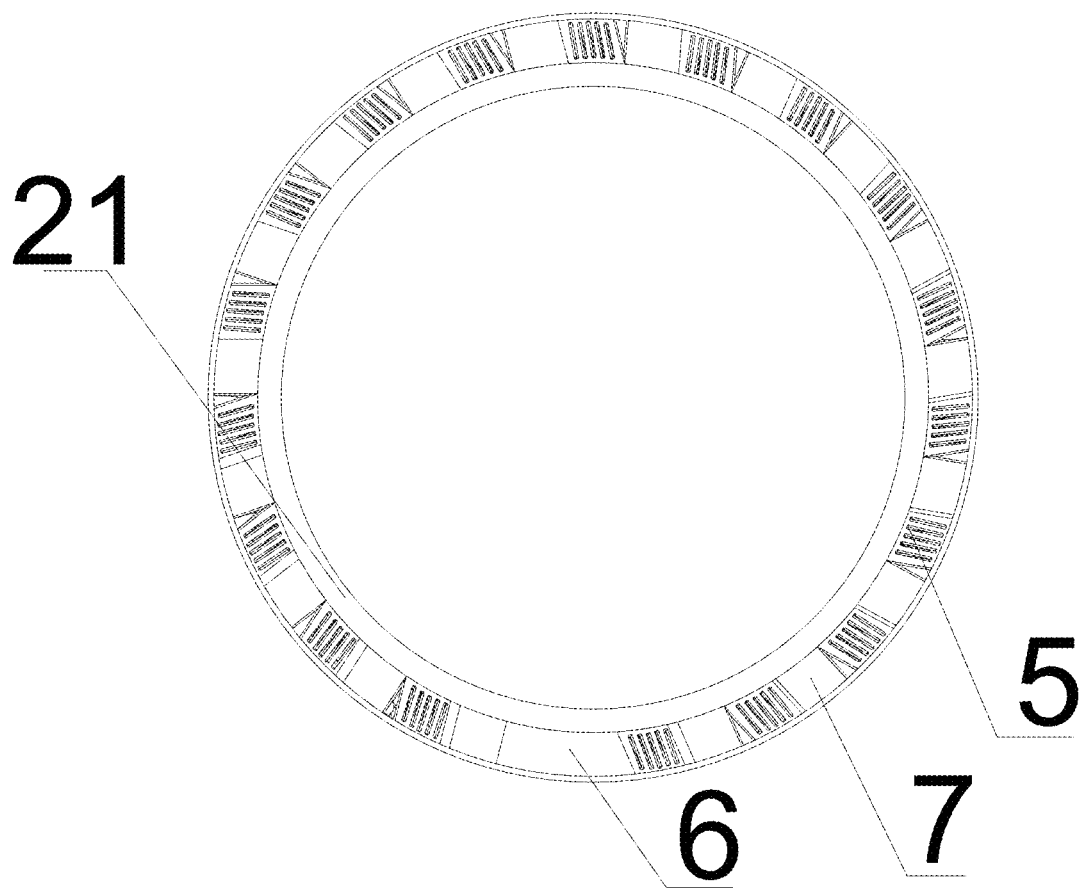
FIG. 2 is a structural section view of the pyrolysis material placement area in the solid hazardous waste pyrolysis device.
Figure 3:
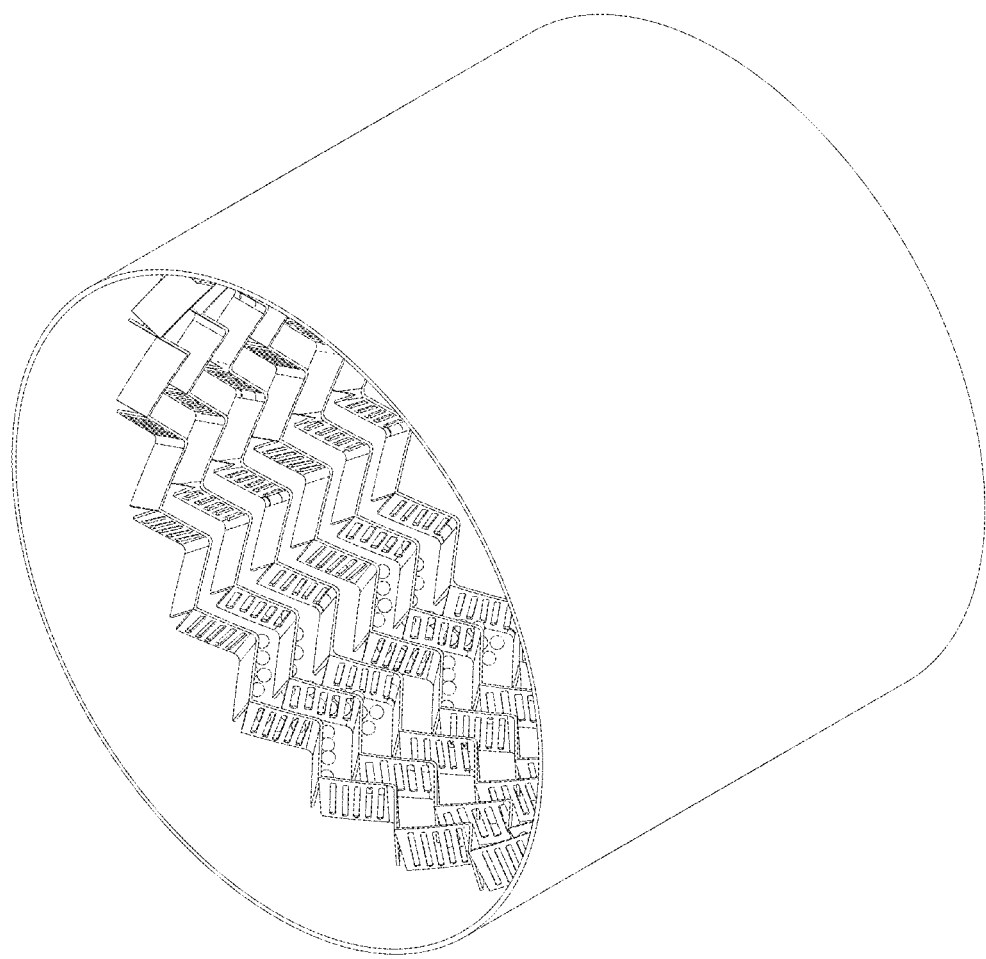
FIG. 3 is a perspective view of the pyrolysis material placement area in the solid hazardous waste pyrolysis device.
Figure 4:
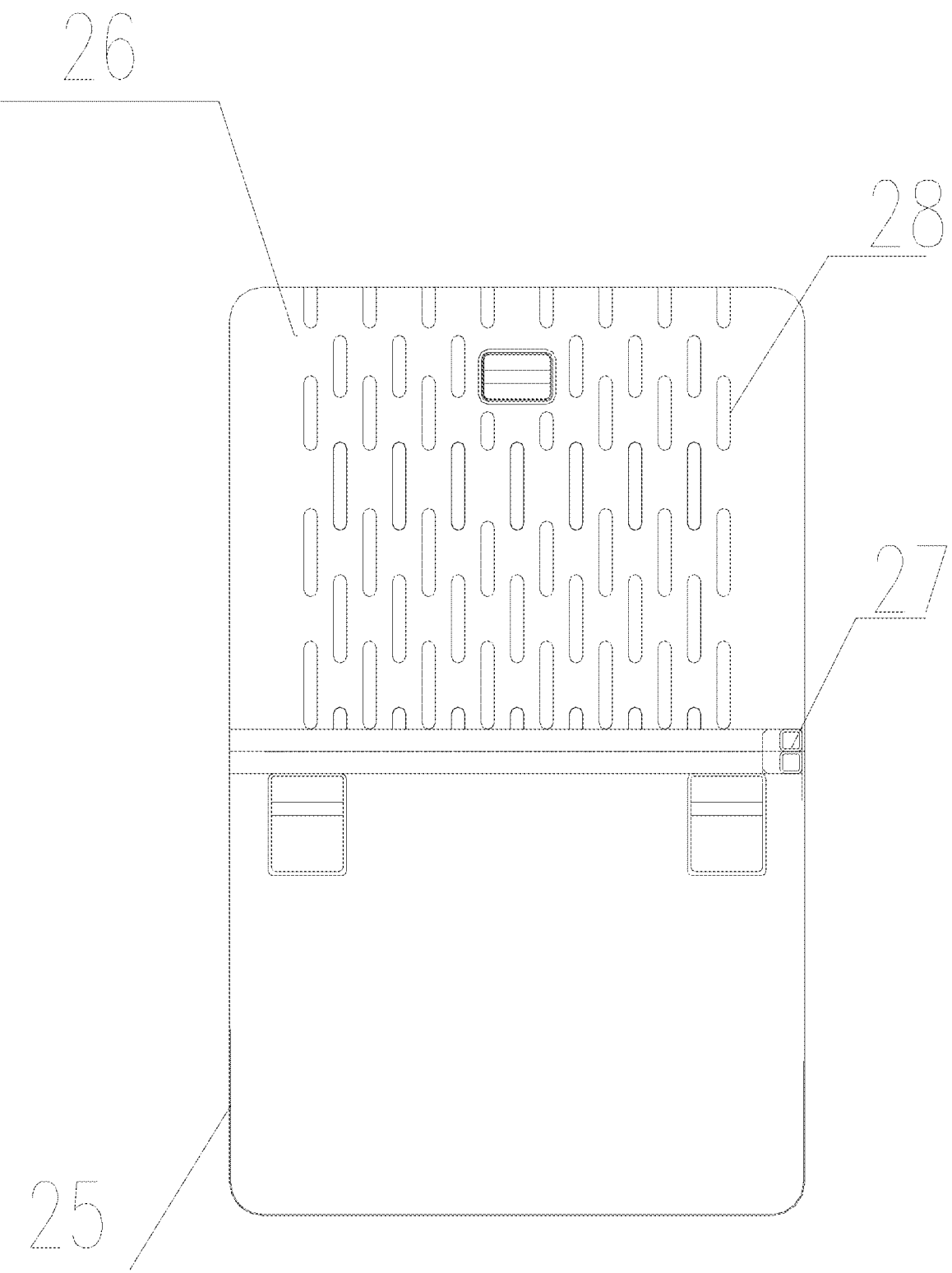
FIG. 4 is a front view of the special pyrolysis box for solid hazardous waste of the present invention.
Figure 5:
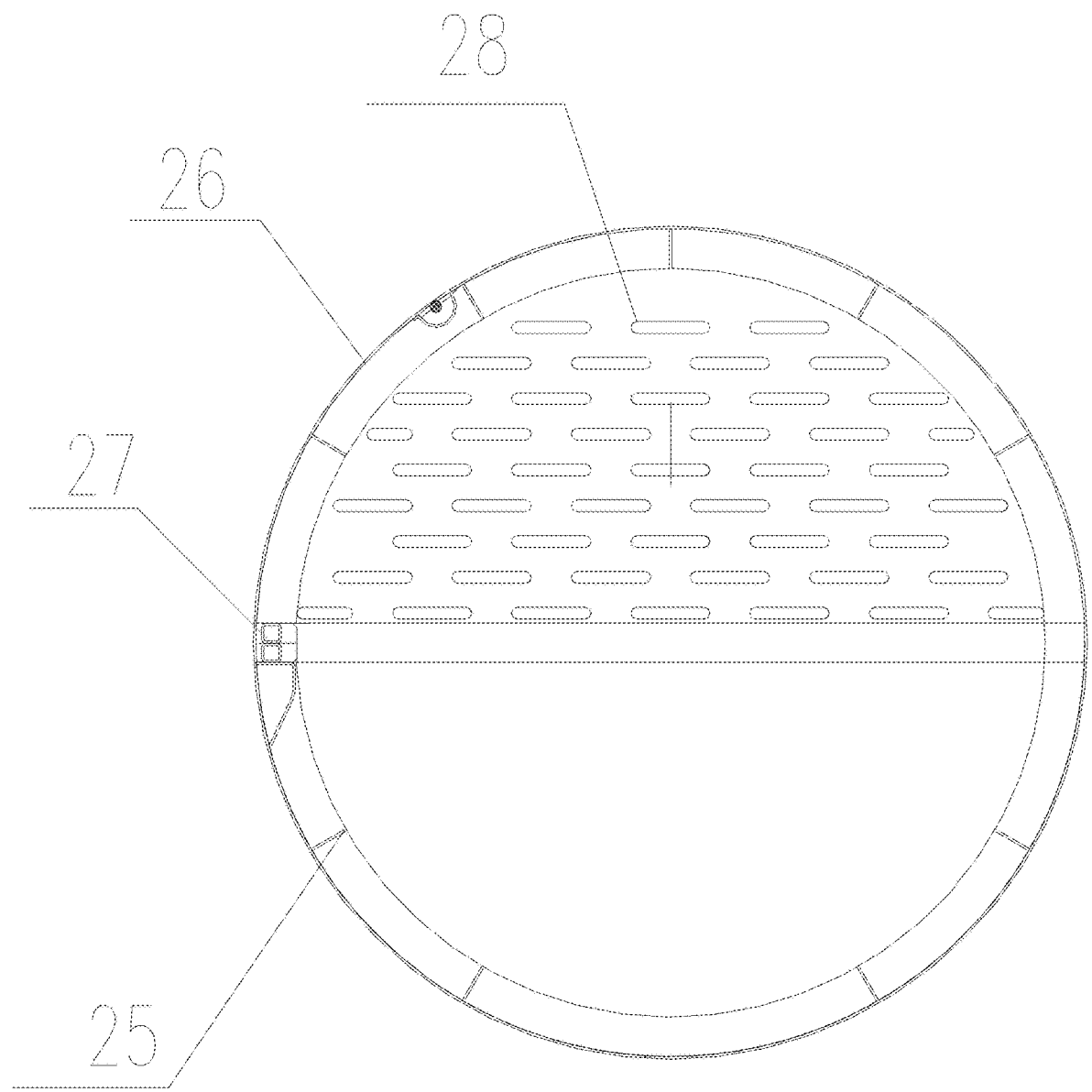
FIG. 5 is a side view of FIG. 4.
Figure 6:
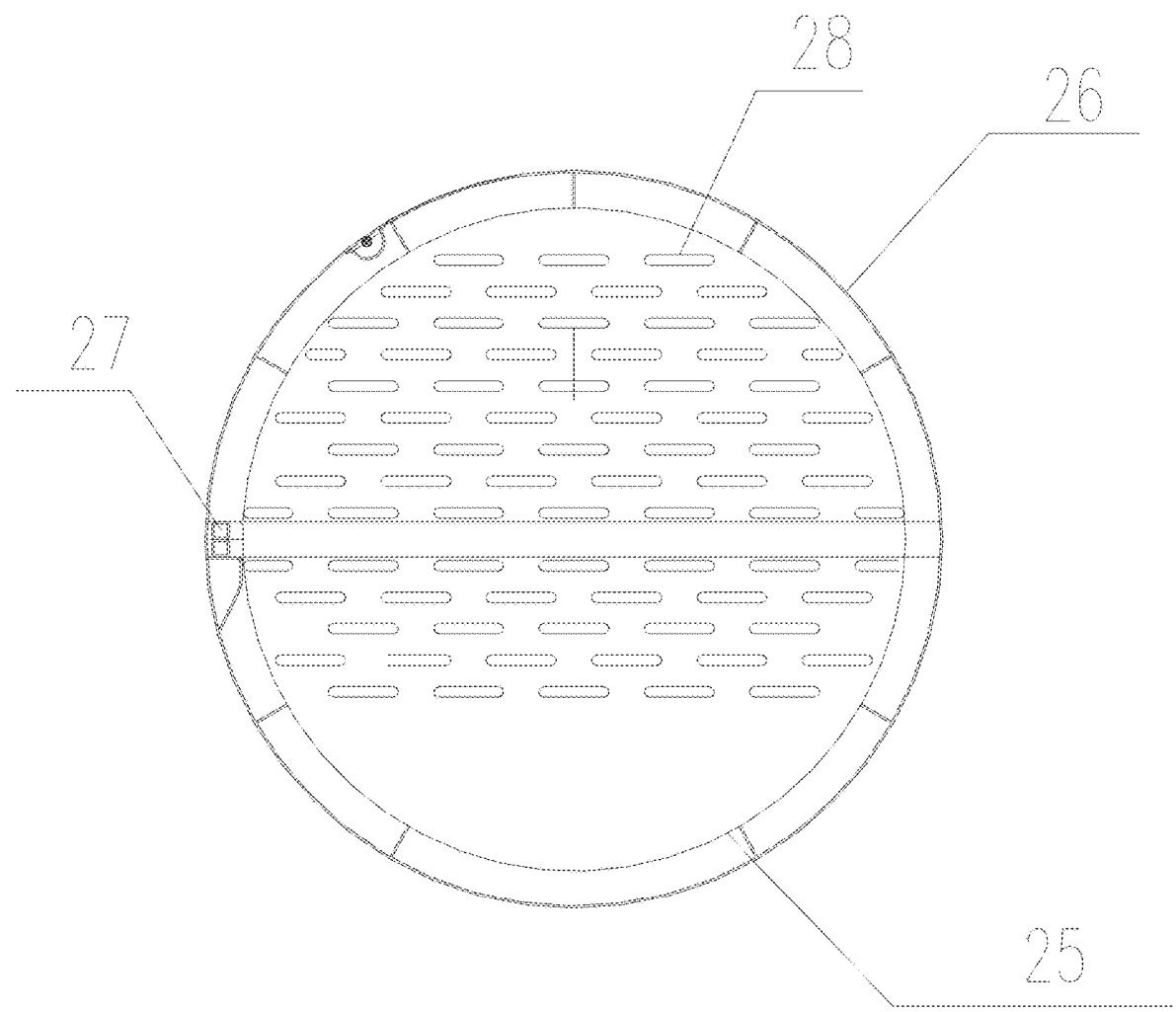
FIG. 6 is a side view of the special pyrolysis box for solid hazardous waste in Embodiment 2.
Figure 7:
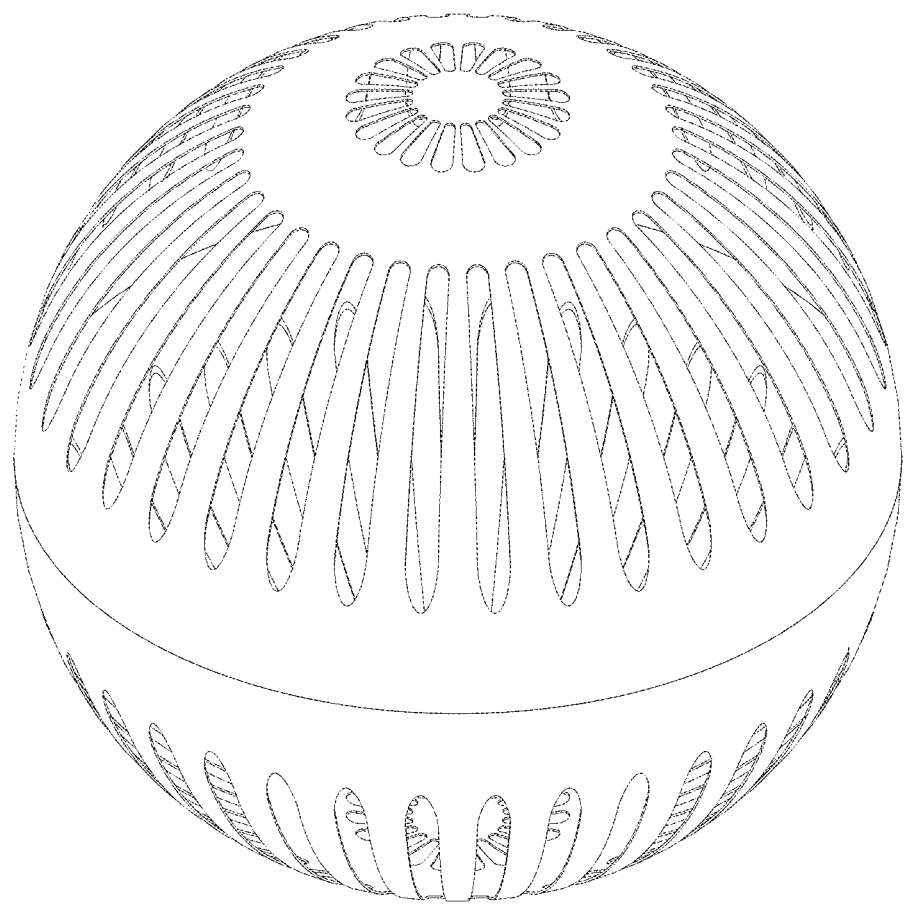
FIG. 7 is a structural diagram of the special pyrolysis box for solid hazardous waste in Embodiment 3.

Wherein, 1. cabin door, 2. outer barrel, 3. hot air outlet, 4. inner barrel, 5. sieve plate I, 6. notch, 7. vertical plate, 8. lifting flight, 9. discharge head, 10. gas retaining annular plate, 11. heat preservation chamber I, 12. outer sealing head, 13. oil and gas pipe, 14. solid material outlet, 15. outlet of the spiral discharging device, 16. feed inlet, 17. heat preservation chamber II, 18. spiral discharging device, 19. rotational mechanism, 20. rotating motor, 21. baffle, 22. reaction medium, 23. hot air inlet, 24. discharge spiral; 25. box body, 26. box lid, 27. rotating shaft, and 28. air vent.

SPECIFIC EMBODIMENTS

Embodiment 1

A full-set equipment for pyrolysis of solid hazardous waste comprises an outer barrel 2 and a rotatable inner barrel 4, at least one pyrolysis material placement area is formed in the inner barrel 4, the placement area is formed by multiple groups of guide plates circumferentially arranged on the inner wall of the inner barrel and baffles 21 arranged on the top of guide plates at the two ends; each group of guide plates comprise vertical plates 7 and sieve plates 5 that are alternately connected; and a reaction medium 22 is provided at the bottom of the inner barrel 4, and a reaction medium is also arranged between each group of guide plates, and the reaction medium is high temperature resistant spheres.

An openable cabin door 1 is arranged on one side of the outer barrel 2, a hot air chamber is arranged between the outer barrel 2 and the inner barrel 4, and a hot air outlet 3 and a hot air inlet 23 are arranged on the outer barrel; the end of the inner barrel 4 far away from the cabin door 1 is provided with a discharge head 9 which is integrated with the inner barrel and can rotate with the inner barrel, the middle of the discharge head 9 is provided with a discharge port, the discharge port is connected with the inner barrel, the center of the discharge port is provided with an oil and gas pipe 13, the air inlet end of the oil and gas pipe 13 is arranged in the inner barrel 4, and the air outlet end passes through the discharge head 9; a discharge spiral 24 is arranged on the inner wall of the discharging port, a lifting flight 8 is arranged on the side of the inner wall of the inner barrel wall close to the discharging port, and a horn shaped solid material outlet 14 is arranged at the end of the discharging spiral 24; the bottom of the discharging head 9 is connected with a solid product discharging device, the device is a spiral discharging device 18, and the feed inlet 16 of the spiral discharging device is arranged below the solid material outlet 14, an outlet 15 of the spiral discharging device is arranged at the top of the discharging device far away from the feed inlet 16.

The outer side of the discharge head 9 is connected with an outer sealing head 12, the outlet end of the oil and gas pipe 13 goes through the outer sealing head 12 and is fixed on the outer sealing head, the outer side of the oil and gas pipe 13 near the outer sealing head is provided with a gas retaining annular plate 10, the outer side of the oil and gas pipe inside the gas retaining annular plate 10 is provided with a heat preservation chamber I 11; and the outer side of the spiral discharging device 18 near the discharge head is also provided with a heat preservation chamber II 17.

The guide plates are circumferentially arranged on the inner barrel, and each group of guide plates is provided with a uniform notch 6, and preferably, the angle between each vertical plate 7 and each sieve plate 5 which is comprised of the guide plate is greater than 90°.

The inner barrel needs to be rotated, so the bottom of both sides of the inner barrel is provided with a rotational mechanism 19, and the rotational mechanism on either side can be connected with a rotating motor 20 to provide energy for the rotation of the inner barrel.

The adopted structure of the special pyrolysis box for solid hazardous waste is as follows: the pyrolysis box is cylindrical, and its length is adapted to the annular track formed by the baffles arranged on the top of guide plates at the two ends.

Comprising a box body 25 and a box lid 26, the box body 25 and the box lid 26 is flexibly connected by a rotating shaft 27 or other ways, the bottom of the box body 15 to ½ height of the box body is a non-porous box body, the rest of the box body 25 and the box 26 are provided with air vents 28, the outside of the box body 25 and the box lid 26 is coated with a pyrolyzable laminating film.

The box lid of the special pyrolysis box for solid hazardous waste with this structure is opened when it is used, and the solid hazardous waste is put into the box body. When the height of hazardous waste piled up in the box body is basically equal to the height of the box lid, the box lid can be directly closed. In order to avoid the random opening of the box body and the box lid, a locking mechanism can be set on the opposite side of the connection structure of the box body and the box lid, such as bayonet, fixed pin, etc., which can achieve locking, so as to avoid the separation of the box body and the box lid in the process of handling and transportation. The ½ height from the bottom of the box body to the lower part of the box body is a non-porous box, which avoids the leakage of a small amount of residual liquid in the solid hazardous waste; the rest of the box body and/or the box lid are provided with air vents, when the pyrolysis box is sent to the pyrolysis device for pyrolysis, there are corresponding air vents to ensure that the gas generated by pyrolysis is discharged. The outermost layer of the box body and the box lid is coated with the pyrolyzable laminating film. The laminating film is directly coated with the prior art after the box body is filled with solid hazardous waste and the box body and the box lid are completely closed, which prevents the leakage of waste liquid, the diffusion of odor and the spread of germs in the process of collection, storage and transportation of solid hazardous waste. In order to achieve better effect, the laminating film needs to be set up in multiple layers. When the pyrolysis box is sent to the pyrolysis device, the laminating film is also pyrolysed, ensuring that the gas generated by pyrolysis can be smoothly discharged from the air vents into the pyrolysis device, it can also avoid the environmental pollution caused by the second unpacking in order to remove the solid waste before pyrolysis.

When in use, the baffle plates arranged on the top of the guide plates at the two ends form a closed annular track, which is convenient for putting the special pyrolysis box containing solid hazardous wastes into it, so that the bottom of the box is supported by the guide plates and will not directly contact with the inner barrel, and with the rotation of the inner barrel, the box body rotates, so that the solid hazardous waste is uniformly heated and melted for pyrolysis, and the melted material drops to the guide plate below through the holes, and continues to pyrolyse after wrapping the spherical reaction medium; combined with the characteristics of the guide plates and the baffles, during the pyrolysis process, in addition to the pyrolysis, most of the materials after melting of solid hazardous waste drop onto the reaction medium spheres. With the reaction medium spheres moving back and forth between the vertical plates and the sieve plates, they collide and extrude with each other, which make the material to be pyrolysed more evenly and improve the pyrolysis efficiency. At the same time, ash and other products will adhere to the reaction medium spheres after pyrolysis is completed, and the reaction medium spheres move back and forth between the vertical plates and the sieve plates, when they strike the sieve plates, this part of ash will be knocked down and enters into the next group of guide plates from the plate holes of the sieve plates. After the rotation of the barrel body, this kind of impact occurs one by one, and this part of ash can be sent out from the plate holes and finally discharged from the pyrolysis material placement area; each group of guide plates is provided with a uniform notch, and the reaction medium spheres are arranged at the bottom of the inner barrel, in this way, when the notch is rotated to the bottom of the inner barrel, the reaction medium spheres between the guide plates can be replaced with the reaction medium spheres arranged at the bottom of the inner barrel, at the same time, the materials to be pyrolysed attached to the reaction medium spheres can be dispersed better, and the self-cleaning effect can also be achieved through the interaction between the reaction medium spheres.

When working, it needs to open the cabin door first, put the special pyrolysis box containing solid hazardous waste into the inner barrel, and directly place it between the baffles which is arranged on the top of the guide plates at the two ends. In this way, during the rotation of the inner barrel, the special pyrolysis box actually rotates by itself at the bottom of the inner barrel all the time, and the reaction medium spheres between the guide plates actually move within the range of the bottom of the inner barrel, and its vertical movement range is small, so the medium spheres will not rise with the rotation of the inner barrel, because the inner barrel is set horizontally, with the rotation of the inner barrel, the motion range of the reaction medium spheres in the horizontal direction is also very small, so the reaction medium spheres will not roll back and forth in the inner barrel. However, when the reaction medium spheres hit the sieve plates, the reaction medium spheres are rebounded, but the solid ash attached on them will obtain a horizontal momentum through the impact and will be sent out through the plate holes, this part of ash can be sent out by superposing each other, and the continuous movement of this part of ash in the same direction at the bottom of the inner barrel can be realized, and the direction of movement is determined by the rotation direction of the inner barrel. In the pyrolysis process, in order to ensure the complete pyrolysis of the solid hazardous waste, the rotation direction of the inner barrel can be changed several times, the residence time of the material in the inner barrel can be prolonged, the number of collisions between the medium spheres can be increased, and the pyrolysis efficiency can be improved. When the reaction is completed, it only needs to control the rotation of the inner barrel to make the pyrolysis ash continue to move towards the direction of the discharge port.

When discharging, ensure that the inner barrel continuously rotates in the discharging direction. At this time, under the dual action of the reaction medium spheres and the rotation of the barrel body, the solid ash continues to move toward the outlet end. When moving to the position of the lifting flight, the lifting flight will pick up the ash and send it to the top of the discharge port along with the rotation of the barrel body, the ash falls into the discharge spiral under the action of gravity, the discharge spiral rotates with the inner barrel, thus transporting this part of ash forward, then successively falls into the feed inlet of the spiral discharging device below through the horn shaped solid material outlet, under the function of the spiral discharging device, the sealing of material accumulation in the front section of the outlet of the spiral discharging device is realized, and is finally sent out through the outlet of the spiral discharging device.

In the pyrolysis process, the solid hazardous waste is pyrolysed into oil and gas, which is the main part that we can recycle. Because the oil and gas generated by pyrolysis is continuous, it is necessary to send this part of oil and gas out in time. The oil and gas are sent out of the pyrolysis device through the oil and gas pipe and into the oil and gas post-treating device; since this unit is an intermittent pyrolysis equipment, the temperature distribution in the unit is uneven at the beginning of pyrolysis. When the pyrolysed oil and gas move to the oil and gas pipe, if the temperature of the oil and gas pipe is lower than the pyrolysis temperature, the oil and gas will condense and adhere to the oil and gas pipe, which will affect the final oil and gas yield. In order to avoid this situation, the outer side of the oil and gas pipe near the outer sealing head is provided with a gas retaining annular plate, and the outer side of the oil and gas pipe inside the gas retaining annular plate is provided with a heat preservation chamber I, so that the oil and gas leakage can be prevented first, and at the same time, the heat preservation medium, such as continuous hot air, can be introduced into the heat preservation chamber I, so as to ensure that the temperature of the oil and gas pipe reaches the standard and avoid oil and gas condensation in the oil and gas pipe, further improve oil and gas yield; similarly, in order to prevent oil and gas from condensing and producing oil sludge and other substances after entering the spiral discharging device, the outer side of the spiral discharging device near the discharge head is provided with a heat preservation chamber II, in which the same heat preservation medium as that in the heat preservation chamber I can be introduced, so as to ensure the gas state of oil and gas and realize the gas seal of the spiral discharging device at the same time.

Embodiment 2

A full-set equipment for pyrolysis of solid hazardous waste comprises an outer barrel 2 and a rotatable inner barrel 4, multiple groups of pyrolysis material placement areas are arranged in the inner barrel 4, each group of pyrolysis materials placement areas is formed by multiple groups of guide plates circumferentially arranged on the inner wall of the inner barrel and baffles 21 arranged on the top of guide plates at the two ends; each group of guide plates comprise vertical plates 7 and sieve plates 5 that are alternately connected; and a reaction medium 22 is provided at the bottom of the inner barrel 4, and a reaction medium is also arranged between each group of guide plates, and the reaction medium is high temperature resistant spheres.

An openable cabin door 1 is arranged on one side of the outer barrel 2, a hot air chamber is arranged between the outer barrel 2 and the inner barrel 4, and a hot air outlet 3 and a hot air inlet 23 are arranged on the outer barrel; the end of the inner barrel 4 far away from the cabin door 1 is provided with a discharge head 9 which is integrated with the inner barrel and can rotate with the inner barrel, the middle of the discharge head 9 is provided with a discharge port, the discharge port is connected with the inner barrel, the center of the discharge port is provided with an oil and gas pipe 13, the air inlet end of the oil and gas pipe 13 is arranged in the inner barrel 4, and the air outlet end passes through the discharge head 9; a discharge spiral 24 is arranged on the inner wall of the discharging port, a lifting flight 8 is arranged on the side of the inner wall of the inner barrel wall close to the discharging port, and a horn shaped solid material outlet 14 is arranged at the end of the discharging spiral 24; the bottom of the discharging head 9 is connected with a solid product discharging device, the device is a spiral discharging device 18, and the feed inlet 16 of the spiral discharging device is arranged below the solid material outlet 14, an outlet 15 of the spiral discharging device is arranged at the top of the discharging device far away from the feed inlet 16.

The outer side of the discharge head 9 is connected with an outer sealing head 12, the outlet end of the oil and gas pipe 13 goes through the outer sealing head 12 and is fixed on the outer sealing head, the outer side of the oil and gas pipe 13 near the outer sealing head is provided with a gas retaining annular plate 10, the outer side of the oil and gas pipe inside the gas retaining annular plate 10 is provided with a heat preservation chamber I 11; and the outer side of the spiral discharging device 18 near the discharge head is also provided with a heat preservation chamber II 17.

The guide plates are circumferentially arranged on the inner barrel, and each group of guide plates is provided with a uniform notch 6, and preferably, the angle between each vertical plate 7 and the sieve plate 5 which is comprised of the guide plate is greater than 90°.

The adopted structure of the special pyrolysis box for solid hazardous waste is as follows: the pyrolysis box is cylindrical, and its length is adapted to the annular track formed by the baffles arranged on the top of guide plates at the two ends.

Comprising a box body 25 and a box lid 26, the box body 25 and the box lid 26 is flexibly connected by a rotating shaft 27 or other ways, the bottom of the box body 15 to ⅓ height of the box body is a non-porous box body, the rest of the box body 25 and the box 26 are provided with air vents 28, the outside of the box body 25 and the box lid 26 is coated with a pyrolyzable laminating film.

The inner barrel needs to be rotated, so the bottom of both sides of the inner barrel is provided with a rotational mechanism 19, and the rotational mechanism on either side can be connected with a rotating motor 20 to provide energy for the rotation of the inner barrel.

Embodiment 3

A full-set equipment for pyrolysis of solid hazardous waste comprises an outer barrel 2 and a rotatable inner barrel 4, multiple groups of pyrolysis material placement areas are arranged in the inner barrel 4, each group of pyrolysis materials placement areas is formed by multiple groups of guide plates circumferentially arranged on the inner wall of the inner barrel and baffles 21 arranged on the top of guide plates at the two ends; each group of guide plates comprise vertical plates 7 and sieve plates 5 that are alternately connected; and a reaction medium 22 is provided at the bottom of the inner barrel 4, and a reaction medium is also arranged between each group of guide plates, and the reaction medium is high temperature resistant spheres.

The vertical plates and sieve plates between adjacent two groups of guide plates are interlaced, that is, one group of adjacent two groups of guide plates at the same horizontal position is vertical plates, and the corresponding group is guide plates.

An openable cabin door 1 is arranged on one side of the outer barrel 2, a hot air chamber is arranged between the outer barrel 2 and the inner barrel 4, and a hot air outlet 3 and a hot air inlet 23 are arranged on the outer barrel; the end of the inner barrel 4 far away from the cabin door 1 is provided with a discharge head 9 which is integrated with the inner barrel and can rotate with the inner barrel, the middle of the discharge head 9 is provided with a discharge port, the discharge port is connected with the inner barrel, the center of the discharge port is provided with an oil and gas pipe 13, the air inlet end of the oil and gas pipe 13 is arranged in the inner barrel 4, and the air outlet end passes through the discharge head 9; a discharge spiral 24 is arranged on the inner wall of the discharging port, a lifting flight 8 is arranged on the side of the inner wall of the inner barrel wall close to the discharging port, and a horn shaped solid material outlet 14 is arranged at the end of the discharging spiral 24; the bottom of the discharging head 9 is connected with a solid product discharging device, the device is a spiral discharging device 18, and the feed inlet 16 of the spiral discharging device is arranged below the solid material outlet 14, An outlet 15 of the spiral discharging device is arranged at the top of the discharging device far away from the feed inlet 16.

The outer side of the discharge head 9 is connected with an outer sealing head 12, the outlet end of the oil and gas pipe 13 goes through the outer sealing head 12 and is fixed on the outer sealing head, the outer side of the oil and gas pipe 13 near the outer sealing head is provided with a gas retaining annular plate 10, the outer side of the oil and gas pipe inside the gas retaining annular plate 10 is provided with a heat preservation chamber I 11; and the outer side of the spiral discharging device 18 near the discharge head is also provided with a heat preservation chamber II 17.

The guide plates are circumferentially arranged on the inner barrel, and each group of guide plates is provided with a uniform notch 6, and preferably, the angle between each vertical plate 7 and the sieve plate 5 which is comprised of the guide plate is greater than 90°.

The adopted structure of the special pyrolysis box for solid hazardous waste is as follows: the pyrolysis box is spherical, and its diameter is adapted to the annular track formed by the baffles arranged on the top of guide plates at the two ends.

Comprising a semicircular box body and a box lid, the box body and the box lid is flexibly connected by a rotating shaft arranged on the upper surface of the box body or other ways, the box body and the box lid are provided with air vents, the outside of the box body and the box lid is coated with a pyrolyzable laminating film.

The inner barrel needs to be rotated, so the bottom of both sides of the inner barrel is provided with a rotational mechanism 19, and the rotational mechanism on either side can be connected with a rotating motor 20 to provide energy for the rotation of the inner barrel.

Embodiment 4

A solid hazardous waste pyrolysis process, which is a intermittent pyrolysis process. By collecting the solid hazardous waste into a special pyrolysis box for solid hazardous waste, the shell of the special pyrolysis box for solid hazardous waste is completely sealed and directly shipped transported to the intermittent pyrolysis equipment. Solid waste is pyrolysed through the way of intermittent heating pyrolysis, and the pyrolysis gas produced in the pyrolysis process is continuously discharged, and the solid products produced after pyrolysis are continuously discharged.

The pyrolysis gas generated in the pyrolysis process is continuously discharged, which can promote the improvement of pyrolysis efficiency, and avoid the safety risks caused by excessive gas accumulation. The obtained pyrolysis gas can be processed as soon as possible, which reduces the processing time. For the solid products produced after the pyrolysis process is completed, they are continuously discharged after pyrolysis is finished, which can ensure the sealing performance of the pyrolysis device and the stability of pyrolysis conditions in the whole pyrolysis process. In addition, this method can make the pyrolysis components in the solid hazardous waste stay in the pyrolysis device as much as possible, so that all of them can be pyrolysed into small molecular oil and gas resources and solid products, and improves the yield of oil and gas. At the same time, the harmless treatment of toxic and harmful substances in the hazardous solid waste can be realized in this process, which ensures the safety of the final solid product obtained.

Because some solid hazardous waste itself or in the pyrolysis process will produce a strongly irritating gas, which is different from available oil and gas resources, this part of gas needs separate harmless treatment, so it can be treated in the subsequent pyrolysis gas separation process. For the portion of gas remaining in the pyrolysis device, at the end of the intermittent pyrolysis, the gas in the pyrolysis device is completely replaced and treated harmlessly through steam or other inert gas replacement, to avoid the danger caused by the spillover of this part of gas when the pyrolysis device is opened.

The invention claimed is:

1. A pyrolysis system for solid hazardous waste, comprising a pyrolysis box for solid hazardous waste and pyrolysis equipment, wherein the pyrolysis equipment comprises an outer barrel and a rotatable inner barrel, wherein:

at least one pyrolysis material placement area is formed in the inner barrel, the pyrolysis material placement area is formed by multiple groups of guide plates circumferentially arranged on an inner wall of the inner barrel and baffles arranged on a top of guide plates at two ends;

each group of guide plates comprise perpendicular plates and sieve plates, the perpendicular plates and the sieve plates are perpendicular to the inner wall of the inner barrel and the perpendicular plates and the sieve plates are connected to each other in an alternating pattern;

a reaction medium is provided at the bottom of the inner barrel, high temperature resistant spheres configured to heat and grind the solid hazardous waste are also arranged between each group of guide plates, and the pyrolysis box for solid hazardous waste pyrolysis material is placed within placement area;

an openable cabin door is arranged on one side of the outer barrel, a hot air chamber is arranged between the outer barrel and the inner barrel;

an end of the inner barrel away from the cabin door is provided with a discharge head which is integrated with the inner barrel and can rotate with the inner barrel, a middle of the discharge head is provided with a discharge port, the discharge port is connected with the inner barrel, a center of the discharge port is provided with an oil and gas pipe, an air inlet end of the oil and gas pipe is arranged in the inner barrel, and an air outlet end passes through the discharge head; a discharge spiral is arranged on an inner wall of the discharging port, a lifting flight is arranged on a side of the inner wall of the inner barrel wall close to the discharging port, and a horn shaped solid material outlet is arranged at an end of the discharging spiral;

a bottom of the discharging head is connected with a solid product discharging device, and the solid product discharging device is a spiral discharging device;

an outer side of the discharge head is connected with an outer sealing head, an outlet end of the oil and gas pipe goes through the outer sealing head and is fixed on the outer sealing head; and the pyrolysis box for solid hazardous waste comprises a box body and a box lid, the box body and the box lid are flexibly connected, a lower half of the box body is non-porous, and a rest of the box body and the box lid are provided with air vents.

2. The pyrolysis system for solid hazardous waste according to claim 1, wherein an outer side of the oil and gas pipe near the outer sealing head is provided with a gas retaining annular plate;

an outer side of the oil and gas pipe inside the gas retaining annular plate is provided with a first heat preservation chamber; and an outer side of the spiral discharging device near the discharge head is provided with a second heat preservation chamber.

3. The pyrolysis system for solid hazardous waste according to claim 2, wherein the guide plates are circumferentially arranged on the inner barrel, each group of guide plates is provided with a uniform notch, an angle between each pair of the perpendicular plates and the sieve plates, which are connected to each other in an alternating pattern, is greater than 90°, and one of the perpendicular plates and one of the sieve plates between adjacent two groups of guide plates are interlaced.

4. The pyrolysis system for solid hazardous waste according to claim 1, wherein the guide plates are circumferentially arranged on the inner barrel, each group of guide plates is provided with a uniform notch, an angle between each pair of the perpendicular plates and the sieve plates, which are connected to each other in an alternating pattern, is greater than 90°, and one of the perpendicular plates and one of the sieve plates between adjacent two groups of guide plates are interlaced.

5. The pyrolysis system for solid hazardous waste according to claim 1, wherein a bottom of both sides of the inner barrel is provided with a rotational mechanism, and the rotational mechanism is connected with a rotating motor.

6. The pyrolysis system for solid hazardous waste according to claim 1, wherein a feed inlet of the spiral discharging device is arranged below the solid material outlet, and an outlet of the spiral discharging device is arranged at the top of the discharging device away from the feed inlet.

7. The pyrolysis system for solid hazardous waste according to claim 1, wherein a hot air outlet and a hot air inlet are arranged on the outer barrel.

8. The pyrolysis system for solid hazardous waste according to claim 1, wherein an outside of the box body and the box lid are coated with a pyrolyzable laminating film;

the pyrolysis box for solid hazardous waste is a sphere or a cylinder, and a diameter of the air vent is less than a diameter of the high temperature resistant spheres configured to heat and grind the solid waste.

* * * * *